(12) United States Patent
Czibur et al.

(10) Patent No.: US 10,439,383 B2
(45) Date of Patent: *Oct. 8, 2019

(54) SEAL SYSTEMS FOR OIL-FILLED CABLE TERMINATIONS AND ASSEMBLIES AND METHODS INCLUDING THE SAME

(71) Applicant: TE Connectivity Corporation, Berwyn, PA (US)

(72) Inventors: Alexander R. Czibur, Fuquay-Varina, NC (US); Kathryn Marie Maher, Cary, NC (US); Harry George Yaworski, Cary, NC (US); Mahmoud Seraj, Apex, NC (US); Ganpathy Iyer, Cary, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,473

(22) Filed: Dec. 21, 2017

(65) Prior Publication Data

US 2018/0175603 A1 Jun. 21, 2018

Related U.S. Application Data

(60) Provisional application No. 62/437,328, filed on Dec. 21, 2016.

(51) Int. Cl.
*H02G 15/013* (2006.01)
*H02G 15/00* (2006.01)
(Continued)

(52) U.S. Cl.
CPC ......... *H02G 15/013* (2013.01); *H02G 15/003* (2013.01); *H02G 15/064* (2013.01); *H02G 15/23* (2013.01)

(58) Field of Classification Search
None
See application file for complete search history.

(56) References Cited

U.S. PATENT DOCUMENTS

| 3,035,113 A | * | 5/1962 | Danchuk | H01R 4/72 156/49 |
| 3,313,902 A | * | 4/1967 | Akin | G01F 23/242 200/190 |

(Continued)

FOREIGN PATENT DOCUMENTS

| WO | 20060015735 | 2/2006 |
| WO | 20120155934 | 11/2012 |

OTHER PUBLICATIONS

Brochure, "Oil-Filled Termination Up to 245 kV", Energy///Oil-Filled Termination, TE Connectivity, 4 pages, available as of filing date.

(Continued)

*Primary Examiner* — Dimary S Lopez Cruz
*Assistant Examiner* — Muhammed Azam
(74) *Attorney, Agent, or Firm* — Myers Bigel, P.A.

(57) ABSTRACT

A seal system for an oil-filled cable termination including a cable extending through each of a cable gland and a stress cone that is spaced apart from the cable gland. The seal system includes: a first oil seal layer surrounding the cable between the cable gland and the stress cone; a second oil seal layer overlapping and contacting the first oil seal layer; a first oil barrier layer overlapping and contacting an upper portion of the second oil seal layer; a second oil barrier layer overlapping and contacting a lower portion of the second oil seal layer, the second oil barrier layer spaced apart from the first oil barrier layer; and a heat shrinkable tube secured around the first and second oil barrier layers.

20 Claims, 13 Drawing Sheets

(51) Int. Cl.
*H02G 15/064* (2006.01)
*H02G 15/23* (2006.01)

(56) References Cited

U.S. PATENT DOCUMENTS

| | | | | |
|---|---|---|---|---|
| 3,715,449 | A * | 2/1973 | Cunningham | H02G 15/22 174/11 BH |
| 3,716,652 | A | 2/1973 | Lusk et al. | |
| 4,046,958 | A | 9/1977 | Lusk | |
| 4,051,456 | A * | 9/1977 | Heilhecker | E21B 17/003 175/104 |
| 4,079,186 | A | 3/1978 | Lusk | |
| 4,228,318 | A | 10/1980 | Selsing | |
| 4,234,755 | A * | 11/1980 | Simons | H02G 15/30 174/19 |
| 4,431,861 | A * | 2/1984 | Clabburn | B29C 61/0616 156/86 |
| 4,943,685 | A | 7/1990 | Reynaert | |
| 5,374,784 | A * | 12/1994 | Wentzel | H02G 15/103 156/49 |
| 8,579,033 | B1 * | 11/2013 | Robichaux | E21B 33/06 166/351 |
| 9,871,363 | B1 * | 1/2018 | Czibur | H02G 15/23 |
| 2007/0292705 | A1 * | 12/2007 | Moncla | C08J 3/12 428/523 |
| 2009/0283294 | A1 * | 11/2009 | Bukovnik | H01B 3/40 174/102 R |
| 2010/0065302 | A1 * | 3/2010 | Nesbitt | E21B 17/028 174/116 |
| 2010/0132976 | A1 * | 6/2010 | Tognali | H02G 15/10 174/113 R |
| 2010/0181099 | A1 * | 7/2010 | Kameda | H02G 15/1833 174/25 R |
| 2012/0193142 | A1 * | 8/2012 | Mori | H02G 15/064 174/75 R |
| 2013/0183003 | A1 | 7/2013 | Cairns | |
| 2013/0304179 | A1 * | 11/2013 | Bialas | A61F 2/966 623/1.11 |
| 2014/0076624 | A1 | 3/2014 | Bohlin et al. | |
| 2014/0182878 | A1 | 7/2014 | Quaggia | |
| 2018/0175603 | A1 * | 6/2018 | Czibur | H02G 15/23 |

OTHER PUBLICATIONS

Brochure, "Raychem High Voltage Cable Accessories up to 170 kV", Raychem from TE Connectivity, 56 pages, available as of filing date.
Sudkabel, Outdoor Termination and Accessories for High and Extra-High Voltage XLPE Cables, 2004, 19 pages.

* cited by examiner

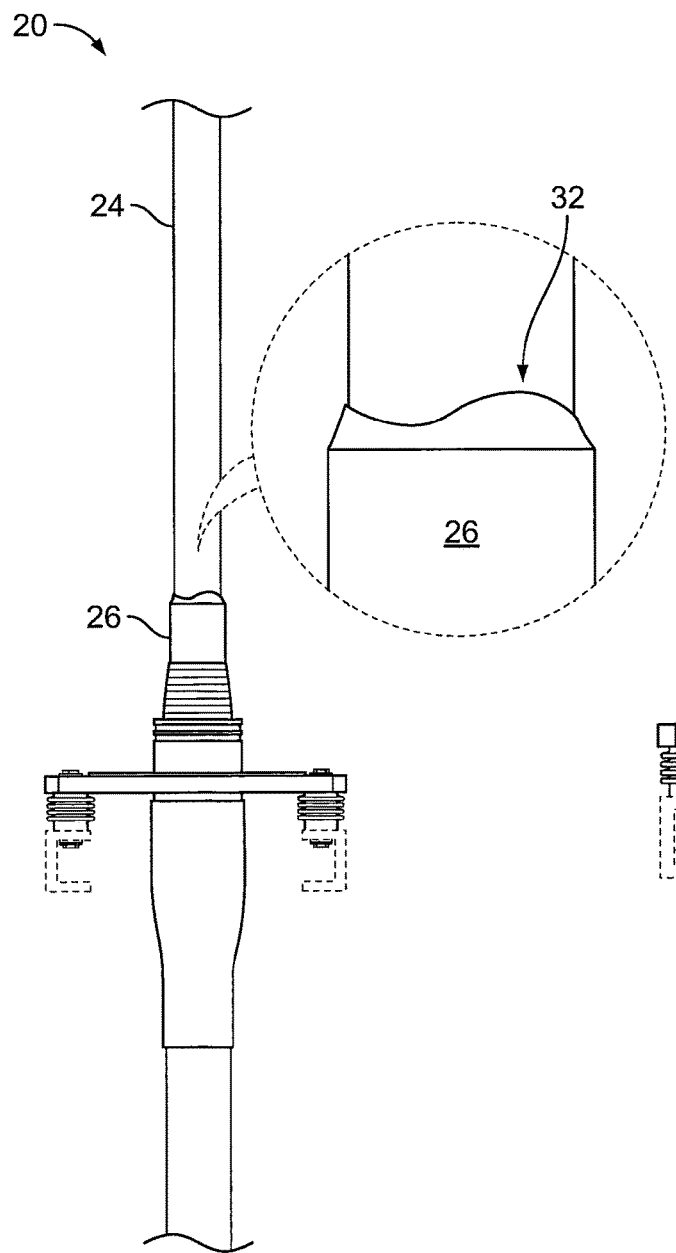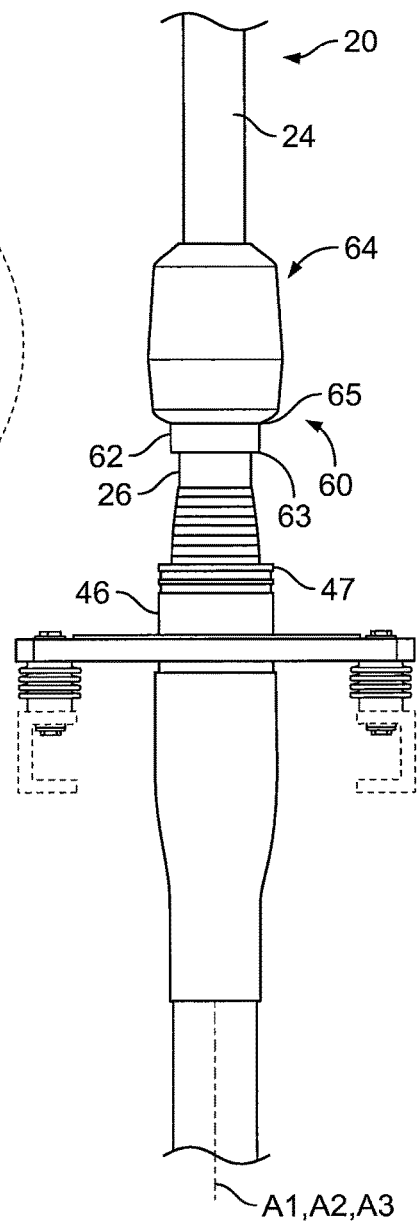
FIG. 4
FIG. 5

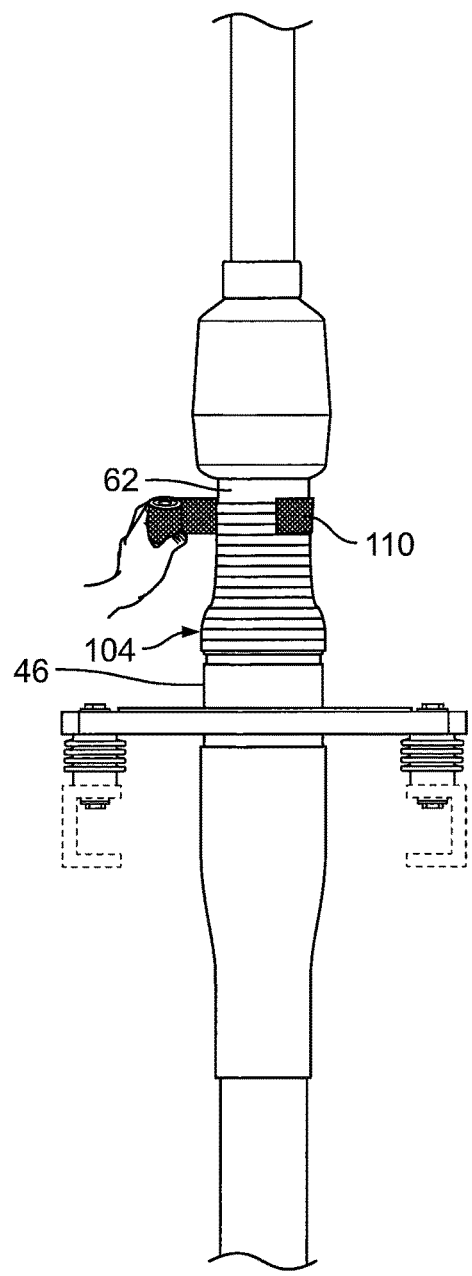 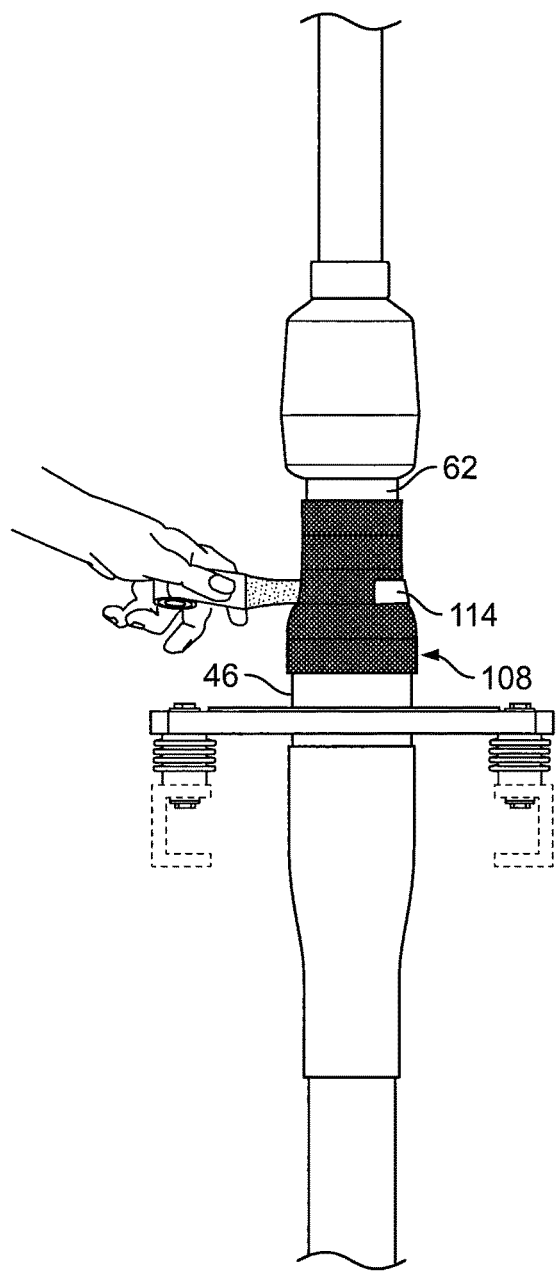
FIG. 8   FIG. 9

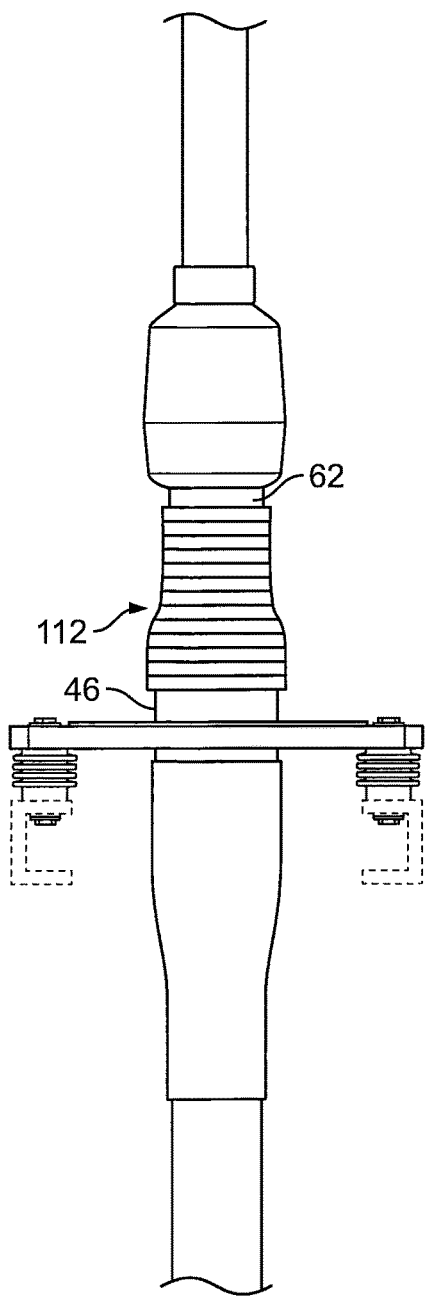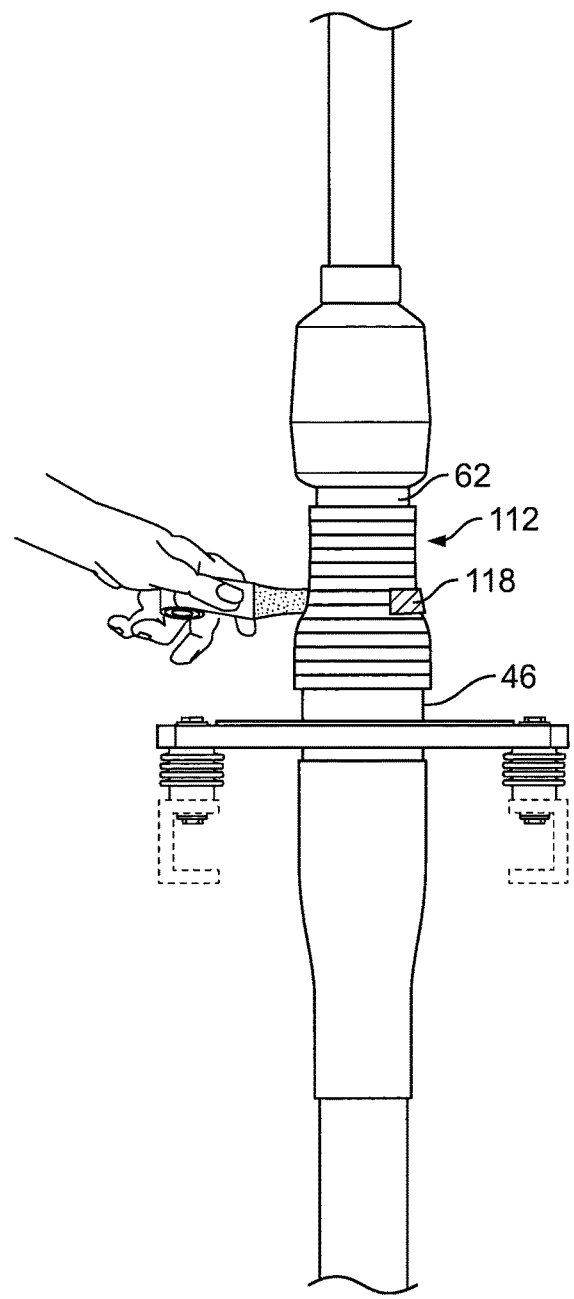
FIG. 10  FIG. 11

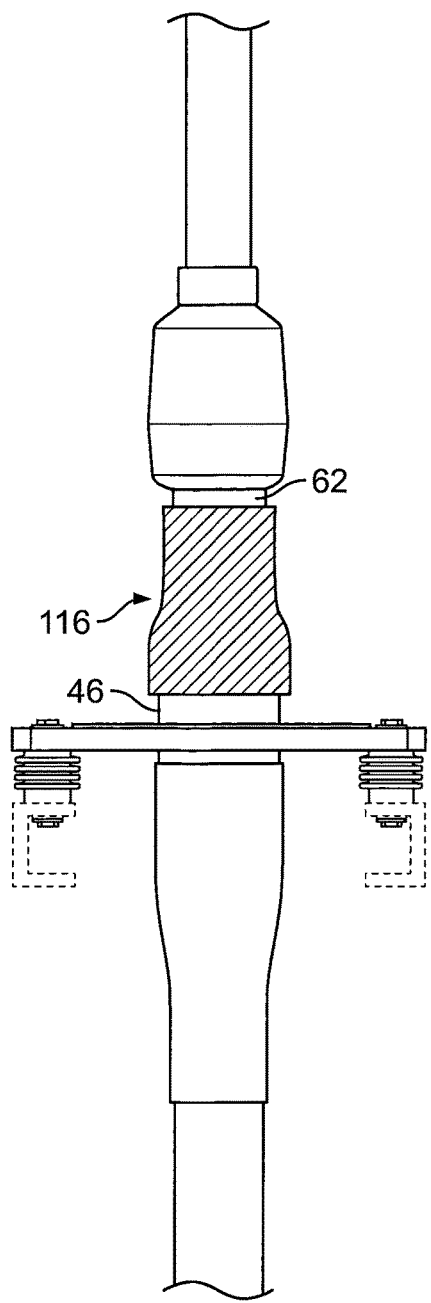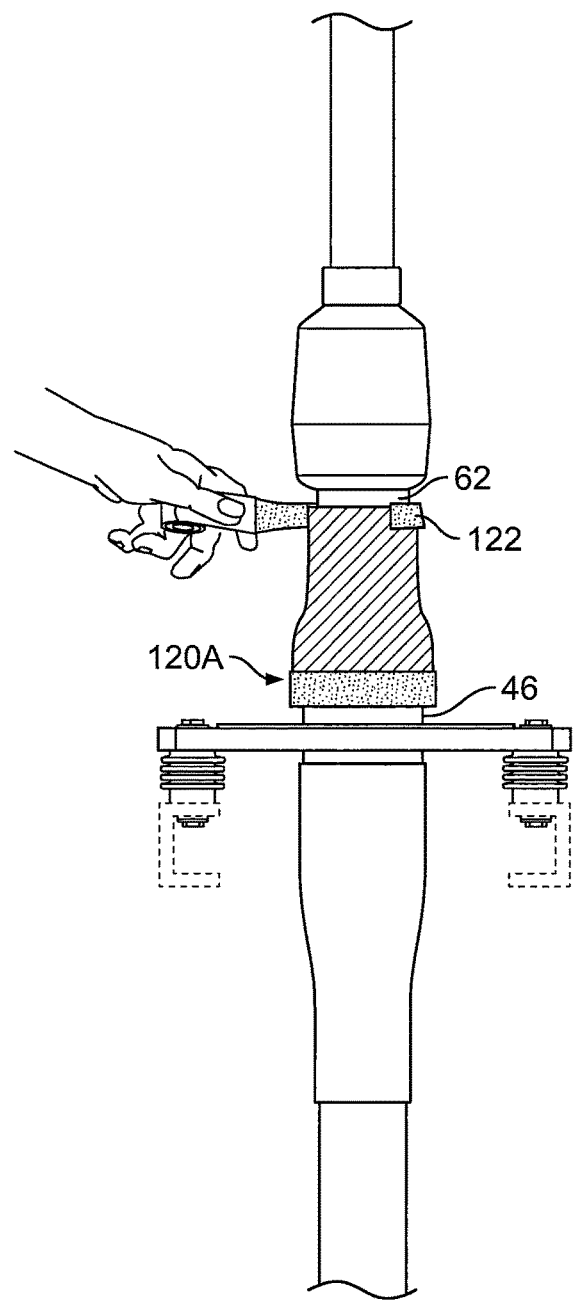
FIG. 12    FIG. 13

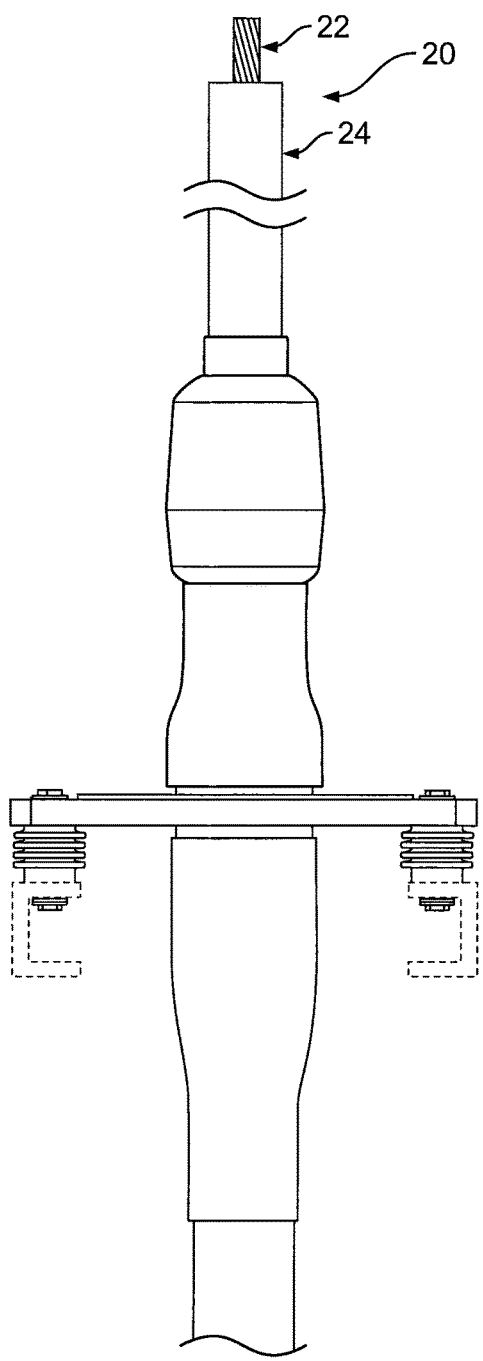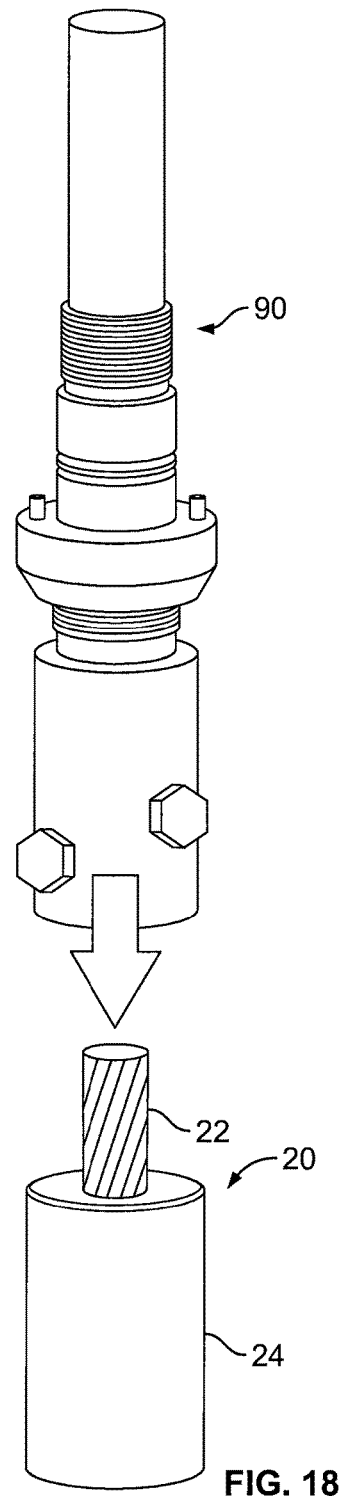
FIG. 17
FIG. 18

SEAL SYSTEMS FOR OIL-FILLED CABLE TERMINATIONS AND ASSEMBLIES AND METHODS INCLUDING THE SAME

RELATED APPLICATIONS

This application claims priority from U.S. Provisional Application No. 62/437,328, filed Dec. 21, 2016, the disclosure of which is incorporated by reference in its entirety.

BACKGROUND

Some cable terminations, such as those used for high voltage outdoor applications, include an electrically insulative housing around the cable. The housing is sometimes filled with oil to serve as a dielectric medium between the cable and the housing.

SUMMARY

Some embodiments of the present invention are directed to a seal system for an oil-filled cable termination including a cable extending through each of a cable gland and a stress cone that is spaced apart from the cable gland. The seal system includes: a first oil seal layer surrounding the cable between the cable gland and the stress cone; a second oil seal layer overlapping and contacting the first oil seal layer; a first oil barrier layer overlapping and contacting an upper portion of the second oil seal layer; a second oil barrier layer overlapping and contacting a lower portion of the second oil seal layer, the second oil barrier layer spaced apart from the first oil barrier layer; and a heat shrinkable tube secured around the first and second oil barrier layers.

According to some embodiments, the first oil seal layer includes ethylene propylene rubber (EPR) self-amalgamating tape. The first oil seal layer may overlap and contact each of the cable gland and the stress cone.

According to some embodiments, the second oil seal layer includes silicone tape. The second oil seal layer may be substantially coextensive with the first oil seal layer.

According to some embodiments, the first and second oil barrier layers each include mastic material. The first oil barrier layer may overlap and contact the cable gland and/or the second oil barrier layer may overlap and contact the stress cone.

According to some embodiments, the heat shrinkable tube overlaps and contacts each of the cable gland and the stress cone.

According to some embodiments, the seal system includes: semiconductor layer overlapping and contacting the cable between the cable gland and the stress cone; and a copper mesh layer overlapping and contacting the semiconductor layer, wherein the first oil seal layer overlaps and contacts the copper mesh layer.

According to some embodiments, the seal system decreases in diameter from the cable gland to the stress cone.

According to some embodiments: the first oil seal layer includes ethylene propylene rubber (EPR) self-amalgamating tape; the second oil seal layer includes silicone tape; the first and second oil barrier layers each include mastic material; and the second oil seal layer, the first and second oil barrier layers and/or the heat shrinkable tube form a barrier such that insulating oil surrounding the heat shrinkable tube does not contact or reach the first oil seal layer.

Some other embodiments of the present invention are directed to a method for forming a seal system for an oil-filled cable termination including a cable that is received through each of a cable gland and a stress cone that is spaced apart from the cable gland. The method includes: forming a first oil seal layer around the cable between the cable gland and the stress cone; forming a second oil seal layer on the first oil seal layer; forming a first oil barrier layer on a lower portion of the second oil seal layer; forming a second oil barrier layer that is spaced apart from the first oil barrier layer on an upper portion of the second oil seal layer; and securing a heat shrinkable tube around the first and second oil barrier layers.

According to some embodiments, forming the first oil seal layer includes wrapping ethylene propylene rubber (EPR) self-amalgamating tape around the cable. The first oil seal layer may overlap and engage each of the cable gland and the stress cone.

According to some embodiments, forming the second oil seal layer includes wrapping silicone tape around the first oil seal layer. The second oil seal layer may be substantially coextensive with the first oil seal layer.

According to some embodiments, forming the first and second oil barrier layers includes applying mastic material on the second oil seal layer. The first oil barrier layer may overlap and engage the cable gland. The second oil barrier layer may overlap and engage the stress cone.

According to some embodiments, securing the heat shrinkable tube includes heating the heat shrinkable tube. The heated heat shrinkable tube may overlap and engage each of the cable gland and the stress cone.

According to some embodiments, the method includes: forming a semiconductor layer by wrapping semiconductor tape around the cable before forming the first oil seal layer; and forming a copper mesh layer by wrapping copper mesh around the semiconductor layer, wherein the first oil seal layer overlaps and engages the copper mesh layer.

Some other embodiments of the present invention are directed to an assembly for use with an oil-filled cable termination. The assembly includes: a cable gland; a cable received in the cable gland; a stress cone received around the cable and spaced apart from the cable gland; and a seal system around the cable between the cable gland and the stress cone. The seal system includes: a first oil seal layer surrounding the cable; a second oil seal layer overlapping and contacting the first oil seal layer; a first oil barrier layer overlapping and contacting an upper portion of the second oil seal layer; a second oil barrier layer overlapping and contacting a lower portion of the second oil seal layer, with the second oil barrier layer spaced apart from the first oil barrier layer; and a heat shrinkable tube secured around the first and second oil barrier layers. Various embodiments of the seal system are described herein.

According to some embodiments, the assembly includes a base plate including a seat defining an opening. The cable gland may include a tubular portion with the cable received therein and a plate portion held on the base plate seat such that the cable and the cable gland extend through the opening.

According to some embodiments, the assembly includes an insulator housing coupled to the base plate and surrounding the cable above the base plate, the cable gland tubular portion above the base plate, and the stress cone.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 2 is a side view of a cable used in the cable termination of FIG. 1 according to some embodiments.

FIGS. 3 and 4 are side views illustrating the cable of FIG. 2 received in a cable gland according to some embodiments.

FIG. 5 is a side view illustrating a stress cone received around the cable of FIGS. 3 and 4 according to some embodiments.

FIG. 8 is a side view illustrating the application of a conductive mesh layer over the semiconductor layer.

FIG. 9 is a side view illustrating the application of a first oil seal layer over the conductive mesh layer.

FIG. 10 is a side view illustrating the first oil seal layer.

FIG. 11 is a side view illustrating the application of a second oil seal layer over the first oil seal layer of FIG. 10.

FIG. 12 is a side view of the second oil seal layer.

FIG. 13 is a side view illustrating the application of first and second oil barrier layers over the second oil seal layer of FIG. 12.

FIG. 17 is a side view of the assembly of FIG. 16 with an insulation layer of the cable removed to expose a conductor of the cable.

FIG. 18 is a perspective view of the cable conductor of FIG. 17 being received in a lug.

DETAILED DESCRIPTION

Figure 1:
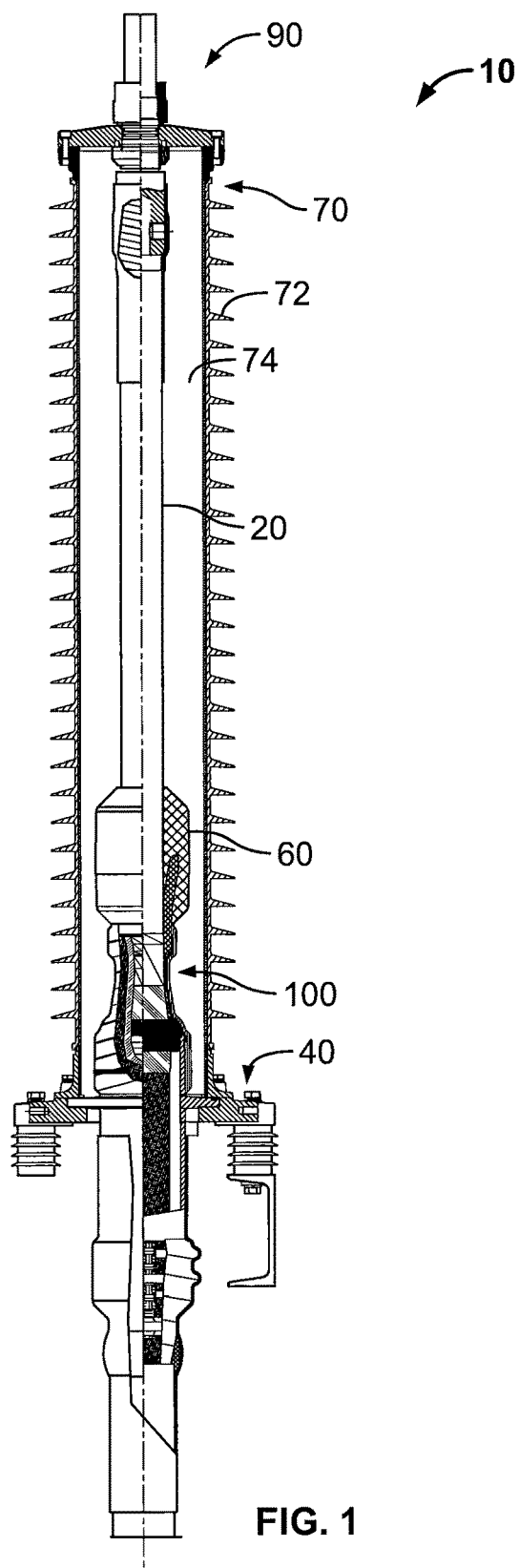
FIG. 1 is a partial sectional view of an oil-filled cable termination according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An oil-filled cable termination assembly 10 is illustrated in FIG. 1. The assembly 10 includes an electrical cable 20. As will be described in more detail below, the cable 20 is received through a base plate and cable gland assembly 40 and a stress cone 60. An insulator housing assembly 70 includes an insulator housing 72 that is at least partially filled with a fluid 74 such as oil. The oil may serve as a dielectric medium between the cable 20 and the housing 70. As will also be described in more detail below, a seal assembly or system 100 provides a seal around the cable 20 between the base plate and gland assembly 40 and the stress cone 60.

Figures 2, 3:
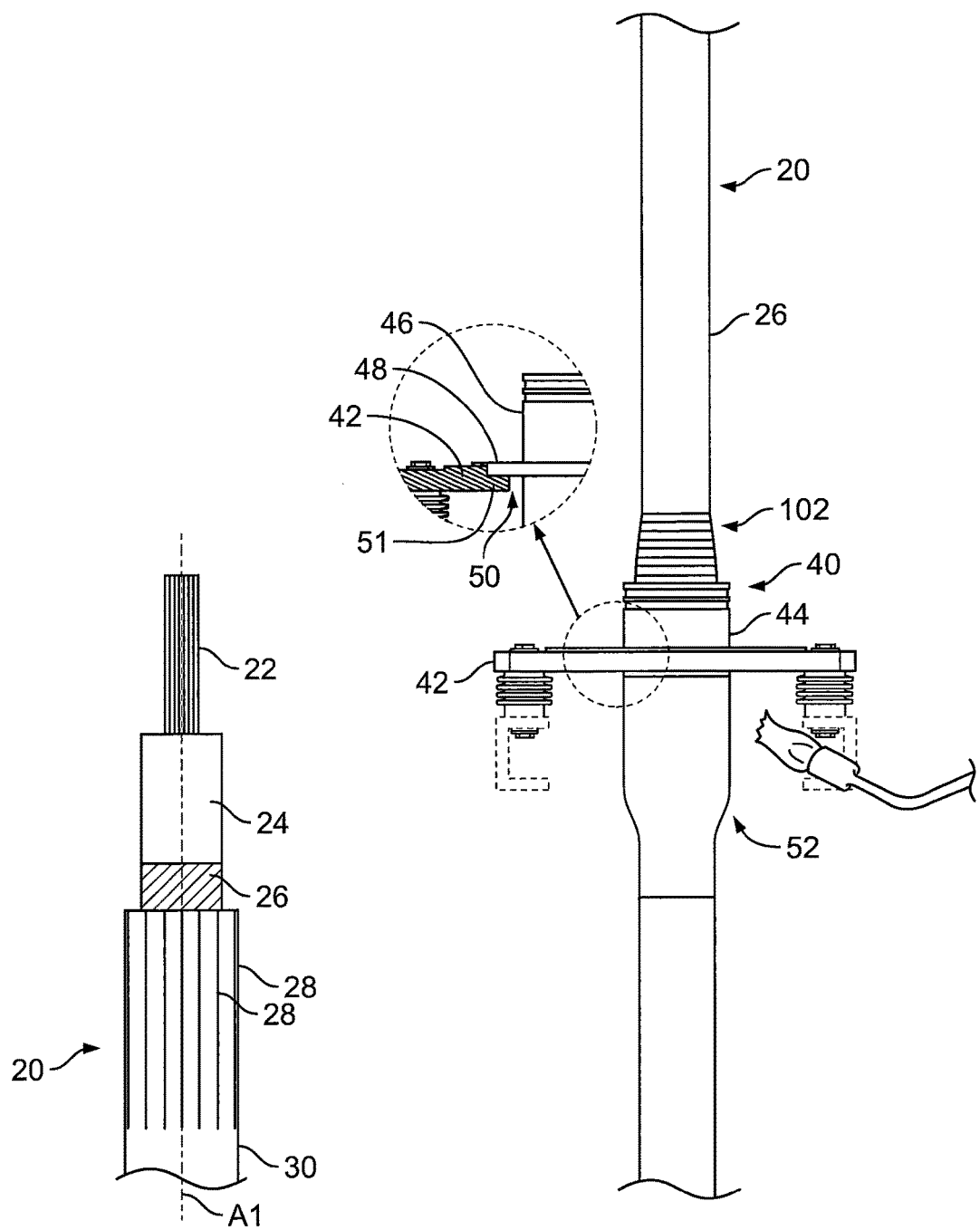

The cable 20 may have the configuration shown in FIG. 2. The cable 20 includes a primary electrical conductor 22, a polymeric insulation layer 24, a semiconductor layer 26 and an outer jacket 30. The primary conductor 22 may be formed of any suitable electrically conductive material such as copper (solid or stranded). The polymeric insulation layer 24 may be formed of any suitable electrically insulative material such as crosslinked polyethylene (XLPE) or ethylene propylene rubber (EPR). The semiconductor layer 26 may be formed of any suitable semiconductor material such as carbon black with silicone. The jacket 30 may be formed of any suitable material such as EPDM or PVC.

An electromagnetic shield layer may be between the semiconductor layer 26 and the jacket 30. Neutral wires 28 from the electromagnetic shield layer may be folded back onto the jacket 30. The wires 28 may be formed of any suitable material such as copper.

The cable 20 may be a high voltage power cable. For example, the cable 20 may be a 138 kV power cable. The cable 20 may be an electrical power transmission cable.

Referring to FIG. 3, the base plate and cable gland assembly 40 includes a base plate 42 and a cable gland 44. The gland 44 includes a tubular portion 46 that is sized and configured to receive the cable 20 and a plate portion 48 that surrounds the tubular portion 46. The plate portion 48 is sized and configured to fit (be seated) within an opening 50 in the base plate 42. The cable 20 may be received through the base plate 42 and then received in the cable gland 44.

More specifically, the base plate 42 may include a seat 51 that defines the opening 50. The cable gland plate portion 48 may be held on the seat 51 and the cable 20 and the cable gland tubular portion 46 may extend through the opening 50.

As understood by those skilled in the art, layers such as fabric layers may be applied to the cable 20 and be surrounded by the cable gland 44. As also understood by those skilled in the art, a lower seal assembly 52 may provide a seal between the cable 20 and a lower portion of the gland 44 (e.g., a lower portion of the gland tubular portion 46). For example, the seal assembly 52 may include one or more fabric layers, one or more mastic layers and/or heat shrinkable tubing.

A semiconductor or semiconductive layer 102 may be applied to the cable 20 before the cable 20 is received in the gland 44. The semiconductor layer 102 may be formed by wrapping semiconductor tape around the cable semiconductor layer 26. The semiconductor layer 102 may extend from inside the gland tubular portion 46 upward along the cable 20.

Referring to FIG. 4, before installing the stress cone 60, a portion of the cable semiconductor layer 26 is removed to expose the cable insulation layer 24. The cable semiconductor layer 26 may be removed to have a chamfered portion 32.

Referring to FIG. 5, the stress cone 60 is urged downwardly with the stress cone 60 surrounding the cable 20. The stress cone 60 includes a lower conductive collar portion 62 and an upper insulating or non-conductive portion 64. According to some embodiments, the stress cone 60 is installed such that the collar portion 62 surrounds the uppermost portion of the cable semiconductor layer 26 (e.g., the chamfered portion 32 shown in FIG. 4).

According to some embodiments, with the cable gland 44 and the stress cone 60 installed around the cable 20, a longitudinal axis A2 of the cable gland 44 (or the cable gland tubular portion 46) and/or a longitudinal axis A3 of the stress cone 60 may coincide or substantially coincide with a longitudinal axis A1 of the cable 20.

Figure 6:
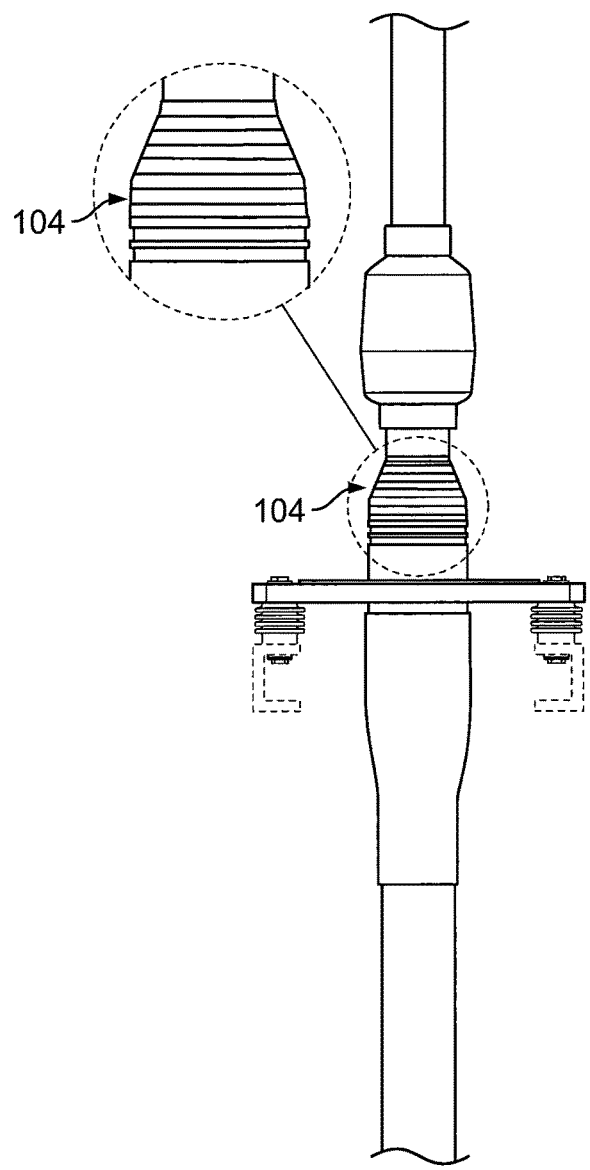
FIGS. 6 and 7 are side views illustrating the application of a semiconductor layer between the cable gland and the stress cone of FIG. 5.
Figure 7:
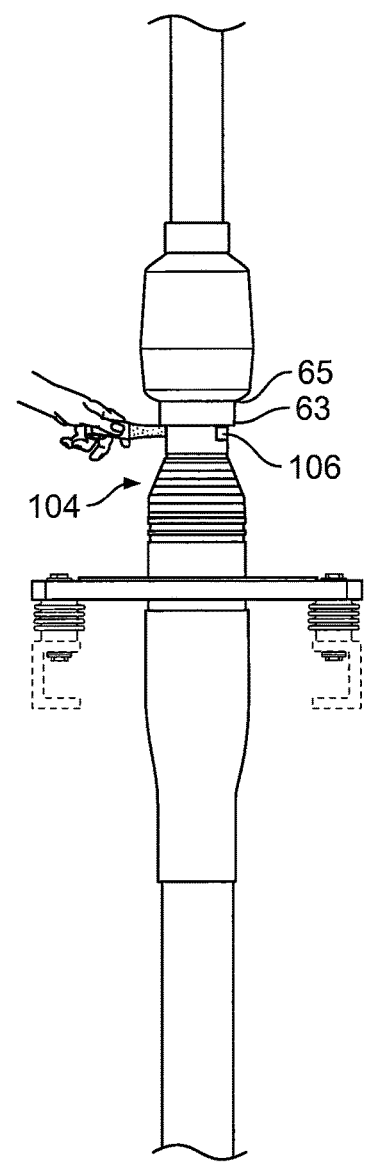

The seal system 100 and methods for forming the same will now be described in greater detail with reference to FIGS. 6-16. Referring to FIGS. 6-8, a semiconductor or semiconductive layer 104 is applied. The semiconductor layer 104 may be formed by wrapping semiconductor or semiconductive tape 106 around the cable 20. For example, the semiconductor tape 106 may be wrapped around the cable 20 and/or the semiconductor layer 102 (FIG. 3). As illustrated in FIG. 7, the semiconductor tape 106 may be wrapped in a manner to build up the diameter of the seal system 100 above the cable gland 44 to provide a smooth transition from the cable gland 44 to the cable 20.

The semiconductor layer 104 may extend to the conductive collar portion 62 of the stress cone 60. For example, referring to FIGS. 7 and 8, the semiconductor tape 106 may be wrapped around the cable 20 so that the semiconductor layer 104 extends from the cable gland 44 to the stress cone 60. According to some embodiments, the semiconductor layer 104 is formed of semiconductive EPR material or tape.

According to some embodiments, the semiconductor layer 104 extends to an upper end 47 of the cable gland tubular portion 46 (FIG. 5). According to some other embodiments, the semiconductor layer 104 extends below the upper end 47 of the cable gland tubular portion 46 to overlap and/or contact (e.g., engage) the cable gland tubular portion 46.

According to some embodiments, the semiconductor layer 104 extends to a lower end 63 of the stress cone collar 62 (FIG. 5). According to some other embodiments, the semiconductor layer 104 extends above the lower end 63 of the stress cone collar 62 to overlap and/or contact the stress cone collar 62.

Referring to FIGS. 3 and 8, the semiconductor layers 102, 104 may be considered a single semiconductor layer. That is, the semiconductor layer 104 may include the semiconductor layer 102 in some embodiments.

As illustrated in FIGS. 8 and 9, a electrically conductive mesh layer 108 may be applied over the semiconductor layer 104. The electrically conductive mesh layer 108 may be a copper mesh layer formed by wrapping copper mesh 110 around the semiconductor layer 104. The copper mesh layer 108 may extend above the semiconductor layer 104 and may overlap and/or contact the stress cone collar 62. The copper mesh layer 108 may extend below the semiconductor layer 104 and may overlap and/or contact the cable gland tubular portion 46.

Referring to FIGS. 9 and 10, a first oil seal layer 112 may be applied over the copper mesh layer 108. The first oil seal layer 112 may be formed by wrapping tape 114 around the copper mesh layer 108. The first oil seal layer 112 may extend above the copper mesh layer 108 and may overlap and/or contact the stress cone collar 62. The first oil seal layer 112 may extend below the copper mesh layer 108 and may overlap and/or contact the cable gland tubular portion 46. According to some embodiments, the tape 114 is an EPR rubber-based self-amalgamating tape.

Referring to FIGS. 11 and 12, a second oil seal layer 116 is applied over the first oil seal layer 112. The second oil seal layer 116 may be formed by wrapping tape 118 around the first oil seal layer 112. The tape 118 may be any suitable self-amalgamating tape. According to some embodiments, the tape 118 is a fusible silicone tape.

The second oil seal layer 116 may extend above the first oil seal layer 112 and may overlap and/or contact the stress cone collar 62. The second oil seal layer 116 may extend below the first oil seal layer 112 and may overlap and/or contact the cable gland tubular portion 46.

Alternatively, at least a portion of the second oil seal layer 116 may be coextensive with the first oil seal layer 112. That is, a position (e.g., height) of a lower end of the first oil seal layer 112 may correspond to that of a lower end of the second oil seal layer 116. Also, a position (e.g., height) of an upper end of the first oil seal layer 112 may correspond to that of an upper end of the second oil seal layer 116.

Figure 14:
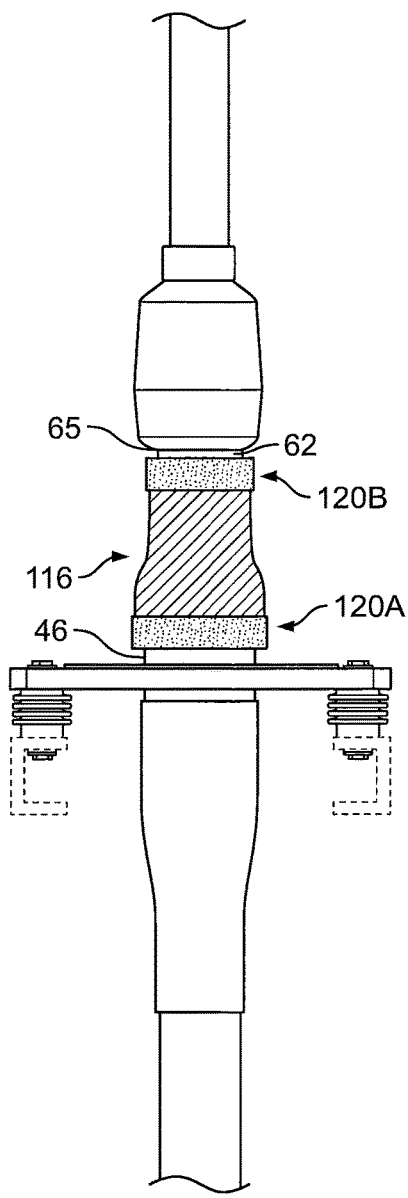
FIG. 14 is a side view illustrating the first and second oil barrier layers.

As illustrated in FIGS. 13 and 14, first and second spaced apart oil barrier layers 120A, 120B are applied over the second oil seal layer 116. Mastic material 122 may be applied to form the oil barrier layers 120A, 120B. A suitable mastic material 122 is sealing mastic tape or material available from TE Connectivity.

The first or lower oil barrier layer 120A may overlap and/or contact the second oil seal layer 116. The first or lower oil barrier layer 120A may extend below the second oil seal layer 116 and may overlap and/or contact the cable gland tubular portion 46.

The second or upper oil barrier layer 120B may overlap and/or contact the second oil seal layer 116. The second or upper oil barrier layer 120B may extend above the second oil seal layer 116 and may overlap and/or contact the stress cone collar 62.

Figure 15:
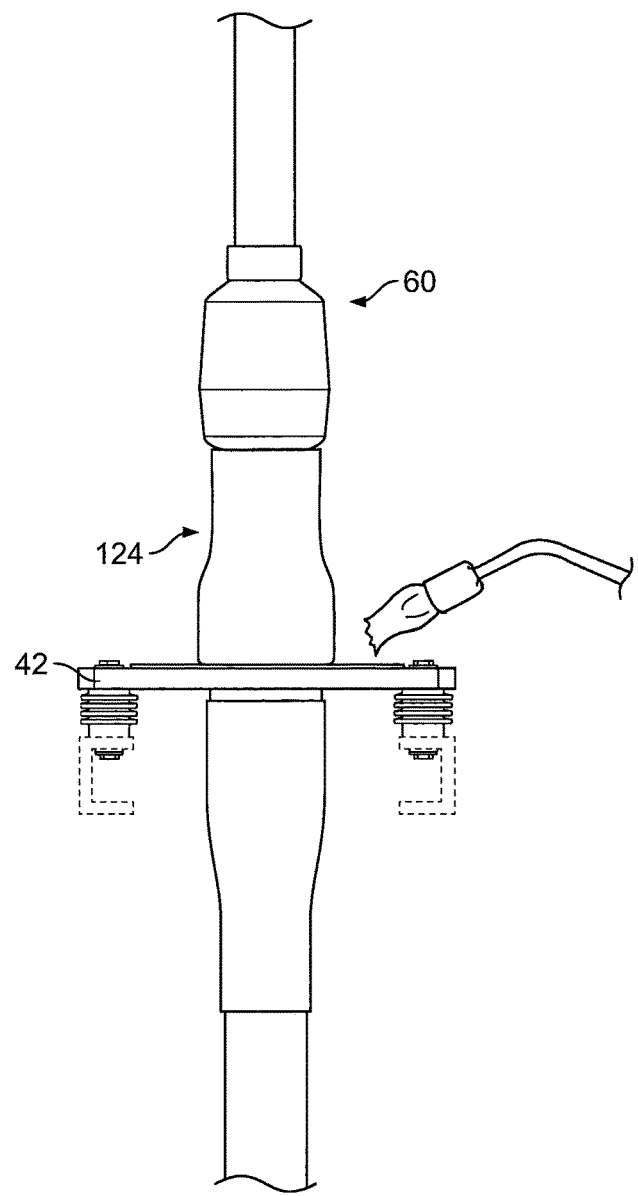
FIG. 15 is a side view illustrating the application of a heat shrinkable tube over the first and second oil barrier layers of FIG. 14.

Turning to FIG. 15, a heat shrinkable tube 124 is installed over the first and second oil barrier layers 120A, 120B. As understood by those skilled in the art, the heat shrinkable tube 124 is secured around the first and second oil barrier layers 120A, 120B by applying heat such that the heat shrinkable tube 124 shrinks in place. A suitable heat shrinkable tube is a heat shrinkable insulating tube (for example, the WCSM-250/65-340/S heat shrinkable tube available from TE Connectivity). According to some embodiments, the heat shrinkable tube 124 includes EPR or EPDM rubber. After heating, the heat shrinkable tube 124 may overlap and/or contact one or both of the first and second oil barrier layers 120A, 120B. The heat shrinkable tube 124 may overlap and/or contact the second oil seal layer 116.

The heat shrinkable tube 124 may overlap and/or contact the stress cone collar 62. The heat shrinkable tube 124 may overlap and/or contact the cable gland tubular portion 46. According to some embodiments, an upper portion of the heat shrinkable tube 124 is adjacent or contacts a step 65 of the stress cone 60 (FIG. 14) which may correspond to an interface between the conductive portion 62 and the non-conductive portion 64 of the stress cone 60 (FIG. 5). According to some embodiments, a lower portion of the heat shrinkable tube 124 is adjacent or contacts the base plate 42.

Referring to FIGS. 17 and 18, the conductor 22 of the cable 20 may be exposed by removing a portion of the insulation layer 24 of the cable 20. The conductor 22 is received in a lug 90. As understood by those skilled in the art, a seal may be applied around the lug and the cable. The seal may include, for example, mastic material and/or a heat shrinkable tube.

Figure 19:
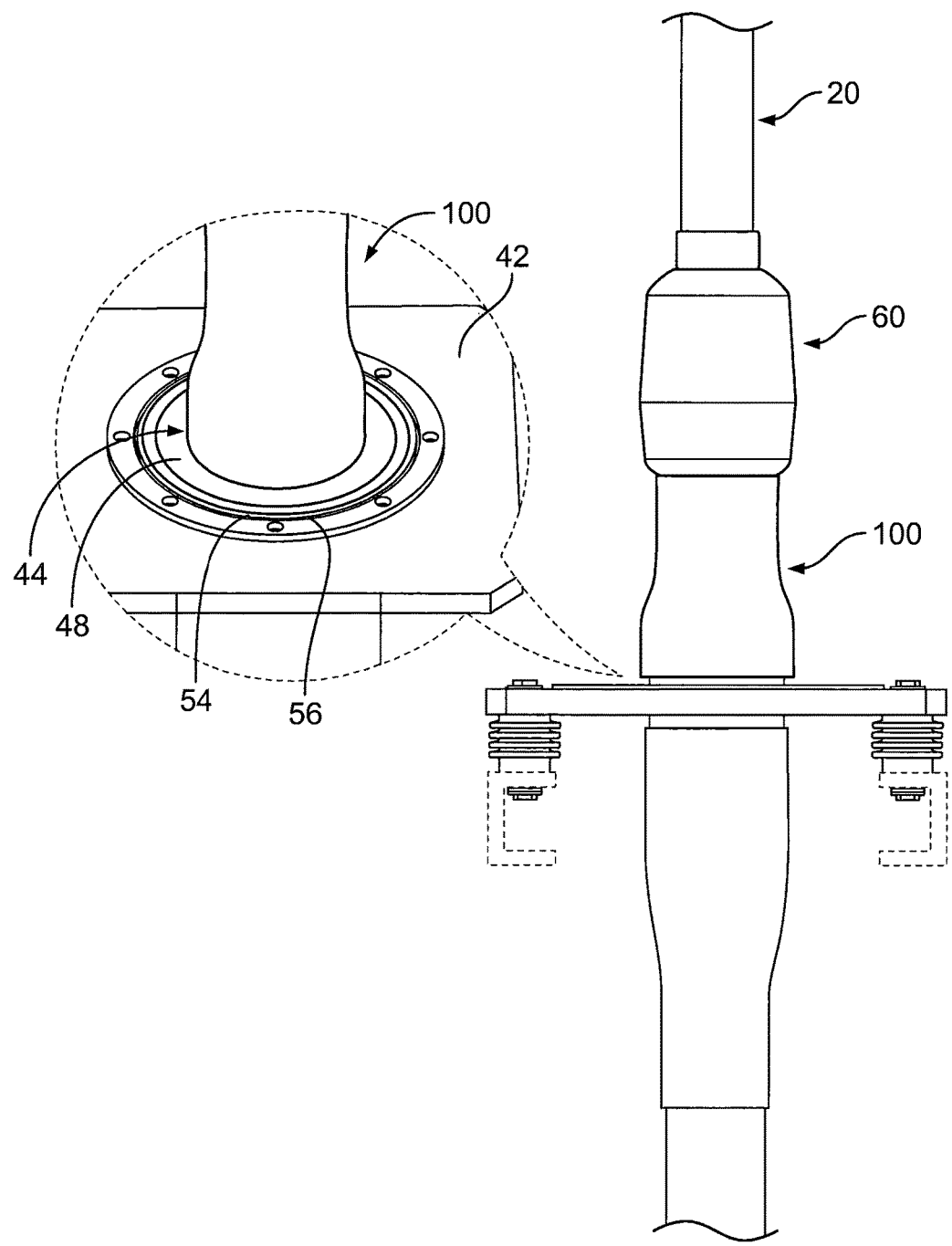
FIG. 19 includes a side view and a fragmentary perspective view of the assembly if FIG. 16.
Figure 20:
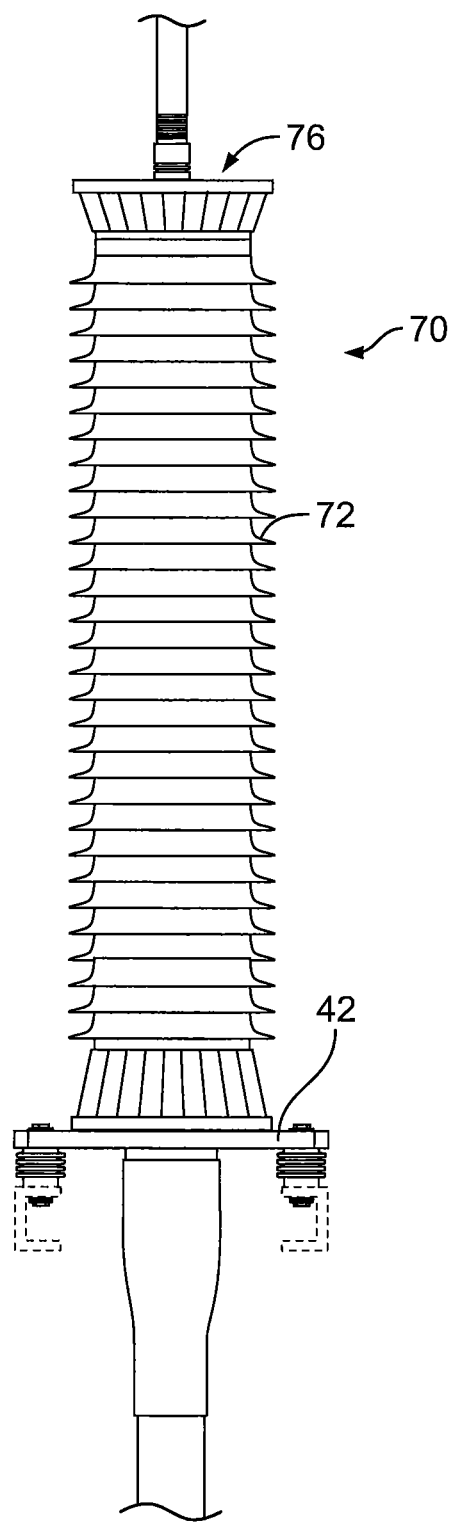
FIG. 20 is a side view of the oil-filled cable termination of FIG. 1 including an insulator housing.
Figure 21:
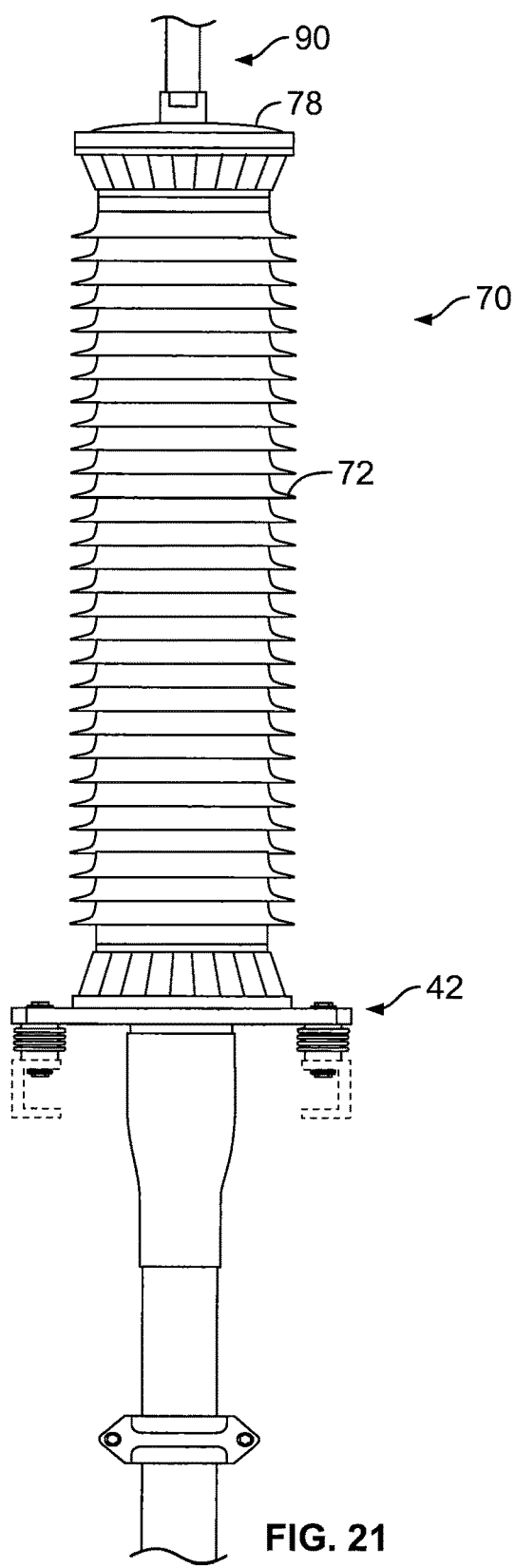
FIG. 21 is a side view of the oil-filled cable termination of FIG. 20 with a top plate installed on the insulator housing.

Referring to FIGS. 19-21, a groove 54 may be defined in the cable gland 44 (e.g., in the cable gland plate portion 48) and an o-ring 56 may be held in the groove 54. The insulator housing 72 is coupled to the base plate 42 to surround the cable 20, the cable gland 44, the stress cone 60 and the seal system 100. The housing 72 may be coupled to the base plate 42 with the o-ring 56 forming a seal there between. Oil is received through an opening 76 in the top of the insulator housing 72 to at least partially fill the housing 72 with oil. A top plate 78 is installed on the insulator housing 72.

As understood by those skilled in the art, the base plate 42 may be connected to the grounding system of a tower or other structure.

According to some embodiments, the oil seal system 100 includes the EPR self-amalgamating tape layer 112 as the first oil seal layer. The oil seal system 100 includes the silicone tape layer 116 as the second oil seal layer over the first oil seal layer 112. The silicone tape layer 116 may be somewhat susceptible to oil such as polyisobutene oil so the first and second mastic layers 120A, 120B may be applied as oil barrier layers. The heat shrinkable tube 124 is then installed over the mastic layers 120A, 120B.

Were a heat shrinkable tube installed directly over the EPR tape layer, the EPR tape layer may lose its compressive force due to the heat and therefore may not retain its tight seal with the cable gland and/or the stress cone. Embodiments of the present invention address this concern by providing the silicone tape layer 116 that isolates the EPR tape layer 112 during heating of the heat shrinkable tube 124.

The mastic layers 120A and 120B are spaced apart at least in part because the mastic tends to melt under heat. A continuous mastic layer may cause the heat shrinkable tube to move from its desired location and possibly fold over.

The silicone tape layer 116, the mastic layers 120A, 120B and/or the heat shrinkable tube 124 form a barrier such that oil such as polyisobutene oil does not contact and/or reach the EPR tape layer 112.

Therefore, the oil seal system 100 according to embodiments described herein provides a robust seal for oil-filled cable terminations, including those employing silicone oil or polyisobutene oil.

Figure 16:
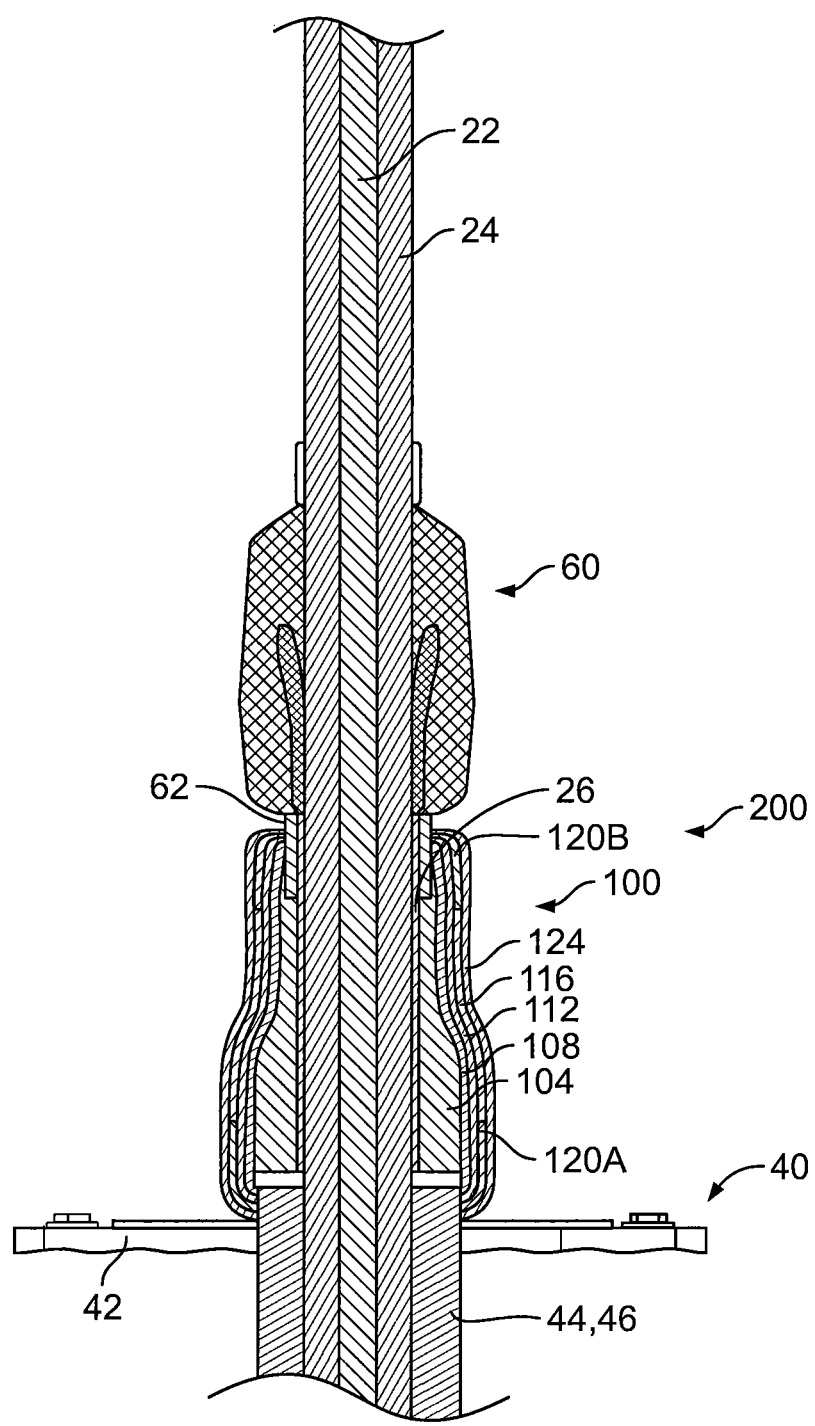
FIG. 16 is a sectional view illustrating an assembly for an oil-filled cable termination including a base plate and cable gland assembly, a stress cone, a cable, and a seal system.

Referring to FIG. 16, according to some embodiments, the seal system 100 decreases in diameter from the cable gland 44 to the stress cone 60.

Some embodiments of the invention are directed to an assembly 200 for use with an oil-filled cable termination. The assembly 200 may include the cable 20, at least a portion of the base plate and cable gland assembly 40, the stress cone 60 and the seal system 100. The assembly 200 may further include other components of the oil-filled cable termination illustrated in FIG. 1.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. An assembly for use with an oil-filled cable termination, the assembly comprising:
  a cable gland;
  a cable received in the cable gland;
  a stress cone received around the cable and spaced apart from the cable gland; and
  a seal system around the cable between the cable gland and the stress cone, the seal system comprising:
    a first oil seal layer surrounding the cable;
    a second oil seal layer overlapping and contacting the first oil seal layer;
    a first oil barrier layer overlapping and contacting an upper portion of the second oil seal layer;

a second oil barrier layer overlapping and contacting a lower portion of the second oil seal layer, the second oil barrier layer spaced apart from the first oil barrier layer; and
a heat shrinkable tube secured around the first and second oil barrier layers.

2. The assembly of claim 1 wherein the first oil seal layer comprises ethylene propylene rubber (EPR) self-amalgamating tape.

3. The assembly of claim 1 wherein the first oil seal layer overlaps and contacts each of the cable gland and the stress cone.

4. The assembly of claim 1 wherein the second oil seal layer comprises silicone tape.

5. The assembly of claim 1 wherein the second oil seal layer is substantially coextensive with the first oil seal layer.

6. The assembly of claim 1 wherein the first and second oil barrier layers each comprise mastic material.

7. The assembly of claim 1 wherein:
the first oil barrier layer overlaps and contacts the cable gland; and
the second oil barrier layer overlaps and contacts the stress cone.

8. The assembly of claim 1 wherein the heat shrinkable tube overlaps and contacts each of the cable gland and the stress cone.

9. The assembly of claim 1 further comprising:
a semiconductor layer overlapping and contacting the cable between the cable gland and the stress cone; and
a copper mesh layer overlapping and contacting the semiconductor layer, wherein the first oil seal layer overlaps and contacts the copper mesh layer.

10. The assembly of claim 1 wherein the seal system decreases in diameter from the cable gland to the stress cone.

11. The assembly of claim 1 wherein:
the first oil seal layer comprises ethylene propylene rubber (EPR) self-amalgamating tape;
the second oil seal layer comprises silicone tape;
the first and second oil barrier layers each comprise mastic material; and
the second oil seal layer, the first and second oil barrier layers and/or the heat shrinkable tube form a barrier such that insulating oil surrounding the heat shrinkable tube does not contact or reach the first oil seal layer.

12. The assembly of claim 1 further comprising a base plate comprising a seat defining an opening, wherein the cable gland comprises a tubular portion with the cable received therein and a plate portion held on the base plate seat such that the cable and the cable gland extend through the opening.

13. The assembly of claim 12 further comprising an insulator housing coupled to the base plate and surrounding the cable above the base plate, the cable gland tubular portion above the base plate, and the stress cone.

14. A method for forming a seal system for an oil-filled cable termination comprising a cable that is received through each of a cable gland and a stress cone that is spaced apart from the cable gland, the method comprising:

forming a first oil seal layer around the cable between the cable gland and the stress cone;
forming a second oil seal layer on the first oil seal layer;
forming a first oil barrier layer on a lower portion of the second oil seal layer;
forming a second oil barrier layer that is spaced apart from the first oil barrier layer on an upper portion of the second oil seal layer; and
securing a heat shrinkable tube around the first and second oil barrier layers.

15. The method of claim 14 wherein:
forming the first oil seal layer comprises wrapping ethylene propylene rubber (EPR) self-amalgamating tape around the cable; and
the first oil seal layer overlaps and engages each of the cable gland and the stress cone.

16. The method of claim 15 wherein:
forming the second oil seal layer comprises wrapping silicone tape around the first oil seal layer; and
the second oil seal layer is substantially coextensive with the first oil seal layer.

17. The method of claim 16 wherein:
forming the first and second oil barrier layers comprises applying mastic material on the second oil seal layer;
the first oil barrier layer overlaps and engages the cable gland; and
the second oil barrier layer overlaps and engages the stress cone.

18. The method of claim 14 wherein:
securing the heat shrinkable tube comprises heating the heat shrinkable tube; and
the heated heat shrinkable tube overlaps and engages each of the cable gland and the stress cone.

19. The method of claim 14 further comprising:
forming a semiconductor layer by wrapping semiconductor tape around the cable before forming the first oil seal layer; and
forming a copper mesh layer by wrapping copper mesh around the semiconductor layer, wherein the first oil seal layer overlaps and engages the copper mesh layer.

20. A seal system for an oil-filled cable termination comprising a cable extending through each of a cable gland and a stress cone that is spaced apart from the cable gland, the seal system comprising:
a first oil seal layer surrounding the cable between the cable gland and the stress cone;
a second oil seal layer overlapping and contacting the first oil seal layer;
a first oil barrier layer overlapping and contacting an upper portion of the second oil seal layer;
a second oil barrier layer overlapping and contacting a lower portion of the second oil seal layer, the second oil barrier layer spaced apart from the first oil barrier layer; and
a heat shrinkable tube secured around the first and second oil barrier layers.

* * * * *